United States Patent [19]
Agre et al.

[11] Patent Number: 6,073,013
[45] Date of Patent: *Jun. 6, 2000

[54] METHOD AND APPARATUS FOR PERFORMING POSITION-BASED CALL PROCESSING IN A MOBILE TELEPHONE SYSTEM

[75] Inventors: Daniel H. Agre, San Diego; Michael K. Spartz, San Marcos; Rodger M. Constandse, San Diego, all of Calif.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,776

[22] Filed: Apr. 10, 1997

Related U.S. Application Data

[63] Continuation-in-part of application No. 08/743,511, Nov. 4, 1996.

[51] Int. Cl.[7] ................... H04Q 7/36; H04Q 7/38
[52] U.S. Cl. ............. 455/428; 455/440; 455/429; 455/446; 455/456; 455/404
[58] Field of Search ................ 455/404, 410, 455/411, 414, 417, 422, 427, 428, 429, 433, 436, 440, 441, 12.1, 13.1

[56] References Cited

U.S. PATENT DOCUMENTS

| | | | |
|---|---|---|---|
| 4,112,257 | 9/1978 | Frost | 455/437 |
| 4,756,007 | 7/1988 | Qureshi et al. | 375/259 |
| 4,763,322 | 8/1988 | Eizenhofer | 370/337 |
| 4,795,210 | 1/1989 | Milat | 297/188.2 |
| 4,905,301 | 2/1990 | Krolopp et al. | 455/434 |
| 5,123,111 | 6/1992 | Delory et al. | 455/432 |
| 5,239,294 | 8/1993 | Flanders et al. | 340/825.34 |
| 5,267,244 | 11/1993 | Messerschmitt et al. | 370/342 |
| 5,396,543 | 3/1995 | Becson, Jr. et al. | 455/422 |
| 5,410,728 | 4/1995 | Bertiger et al. | 455/428 |
| 5,523,997 | 6/1996 | Bishop, Jr. | 455/428 |
| 5,555,444 | 9/1996 | Diekelman et al. | 455/13.1 |
| 5,561,836 | 10/1996 | Sowles et al. | 455/428 |
| 5,713,075 | 1/1998 | Threadgill et al. | 455/427 |
| 5,812,651 | 9/1998 | Kaplan | 455/414 |

*Primary Examiner*—Willis R. Wolfe
*Attorney, Agent, or Firm*—Gregory D. Ogrod; Russell B. Miller

[57] ABSTRACT

The mobile telephone system employs a fleet of satellites and a set of gateway ground stations arranged around the globe for handling communications to and from mobile communication units such as mobile telephones. Signals are transmitted between a subscriber unit and the nearest gateway via one or more of the satellites. The gateway system is configured to process telephone call connection requests from a mobile subscriber unit based upon the location of the subscriber unit. The system parses telephone numbers received from the subscriber unit based upon the parsing scheme of the locality in which the subscriber unit is located at the time the telephone call is placed. The system also identifies any emergency services numbers called, such as 911, and directs such calls to the nearest emergency services center to the current location of the subscriber unit. In another implementation, the system is configured to perform lawful intercept of telephone calls to or from a mobile subscriber unit based upon the location of the subscriber unit. The system determines whether law enforcement agencies have requested that telephone communications to or from a particular subscriber unit be intercepted and determines whether, based on the current location of the subscriber unit, the telephone communications can be permissibly intercepted. Thus, if the jurisdiction of a law enforcement agency to intercept a call is restricted to certain geographical areas, such a particular country, state or county, the system determines whether the subscriber unit is within that geographical area before performing the requested intercept.

30 Claims, 12 Drawing Sheets

FIG. 8

| COUNTRY OR OTHER ENTITY | RANGE OF LOCATIONS | PARSING SCHEME |
|---|---|---|
|  |  |  |
|  |  |  |
| ... |  |  |

| EMERGENCY NUMBER | LOCATIONS OF CORRESPONDING EMERGENCY SERVICES CENTERS |
|---|---|
|  | LOCATION #1 -- DIRECT NUMBER |
|  | LOCATION #2 -- DIRECT NUMBER |
|  | ... |
| EMERGENCY NUMBER | LOCATIONS OF CORRESPONDING EMERGENCY SERVICES CENTERS |
|  | LOCATION #1 -- DIRECT NUMBER |
|  | LOCATION #2 -- DIRECT NUMBER |
|  | ... |

| SUBSCRIBER UNIT | REQUESTING AGENCY | TYPE OF INTERCEPT | ... |
|---|---|---|---|
|  |  |  |  |

| LAW ENFORCEMENT AGENCY | RANGE OF JURISDICTION | ... |
|---|---|---|
|  |  |  |

722

METHOD AND APPARATUS FOR PERFORMING POSITION-BASED CALL PROCESSING IN A MOBILE TELEPHONE SYSTEM

I. RELATED APPLICATIONS

This is a Continuation-in Part of U.S. patent application Ser. No. 08/743,511, filed, Nov. 4, 1996, entitled *"Method and Apparatus for Performing Position- and Preference-Based Service Selection in a Mobile Telephone System"*, still pending.

BACKGROUND OF THE INVENTION

II. Field of the Invention

The invention generally relates to mobile telephone systems and in particular to satellite-based mobile telephone systems.

III. Description of the Related Art

Satellite-based mobile telecommunications systems are being developed that allow a mobile communications subscriber unit such as a mobile telephone to be used almost anywhere in the world. In one system, illustrated in FIG. 1, a fleet of low earth orbit satellites are used along with a set of ground base stations 10 called "gateways". Signals are transmitted from a subscriber unit 12 to satellites 14 (shown as a single satellite for ease of drawing), then relayed down to gateway 10 for routing to one of a set of local service providers, generally denoted 16, which provide an interconnection to local land line telephone networks such as a local Public Switched Telephone Network (PSTN) or to other communication networks operated by the service provider. Depending upon the nature of the communication, the signals are ultimately routed to, for example, a telephone connected to the land line network, or to a mobile telephone perhaps operating in another part of the world covered by a different gateway, or perhaps to a computer system. The signals may encode voice communications such as telephone conversations or data communications such as, for example, facsimile transmissions, Internet connection signals, etc. The subscriber unit 12 may be a hand-held mobile telephone, a mobile telephone mounted in a boat, train or airplane, a laptop computer, a personal data assistant or any other suitable communications unit provided with the proper equipment for communicating with the gateway via the satellite fleet.

A single gateway may handle all telecommunications traffic within an area covering as much as 2000 by 3000 kilometers. FIG. 2 illustrates an exemplary coverage area 18 for a gateway 20 operating in Europe. As can be seen, the coverage area encompasses many countries. Each country typically has one or more service providers. Depending upon the implementation, each service provider may operate only within one country or perhaps only within a portion of one country. Such restrictions may result from physical limitations on the capability of the service provider system or from contractual or other legal constraints. For example, even though operationally capable of doing so, a service provider in France may not be contractually and/or legally allowed to handle mobile communications for a subscriber unit operating in Italy and vice versa. Hence, for subscriber units in France (such as exemplary unit 22), the gateway may need to route communications through a French service provider such as TE.SA.M.; whereas, for subscriber units in Italy, the gateway may need to route communications through an Italian service provider such as Finmeccanica. Further, as represented by arrow 24, subscriber units may move from one country to another. Even within a single country the gateway may need to selectively route communications to different service providers depending upon the location of the subscriber unit within the country. Moreover, the operator of the subscriber unit may be contractually obligated to use certain service providers in certain locations or may be subject to other legal constraints. In addition to any contractual limitations that may prevent telephone connections from the subscriber unit from being connected to particular service providers, the user of the subscriber unit may simply have certain preferences regarding which services provider to employ.

For these and other reasons, it may be desirable for the gateway to be able to reliably coordinate access among numerous service providers and among numerous mobile telephone users over a large geographical area. Previously, no adequate system has been developed for that purpose, particularly one which takes into account user preferences. Aspects of the invention of the parent application cited above are directed toward providing such a system. Briefly, the parent application describes a system for selecting a service provider based upon the location, speed, altitude or other position characteristic of a subscriber unit or upon service provider preferences provided by the subscriber unit, or both. Selection of the service provider is performed, for example, as part of set up operations for a telephone connection initiated by the subscriber unit or terminated at the subscriber unit, or as part of a system registration access procedure initiated by the subscriber unit.

Although the system of the parent application is effective for selecting a service provider based upon the location or other position characteristic of the subscriber unit and thereby overcomes many of the problems described above, other problems remain when subscriber units are taken from one geographical area to another such as from one country to another or from one area code region to another.

For example, as typically implemented, the user of a subscriber unit is required to dial a long distance area code prefix to dial any telephone number, even if the user has carried the subscriber unit into the area code region of the number being called. Hence, even though the user is calling a telephone number that is a local telephone number in the region in which the user is currently located, the user is nevertheless required to dial the number as if it were a long distance call, complete with area code. Likewise, the user is typically required to dial both an international calling code and an area code prefix to dial any telephone number not in the home country of the user, even if the user has carried the subscriber unit into the country of the number being called. Such is particularly problematic for users operating subscriber units in portions of the world such as Europe wherein the user may frequently need to carry the subscriber unit from one country to another.

Occasionally, the user may forget these dialing restrictions and may dial a telephone number without the area code or international dialing code number expecting to be connected to a local number and instead, depending upon the implementation, being erroneously connected to the corresponding local number in the home area code or perhaps even in the home country of the user. Such can be a particularly significant problem if the local number being dialed is an emergency services telephone number such as "911" or a direct police, fire, or ambulance number. Indeed, in emergency situations the user is less likely to remember any dialing restrictions. Also, some subscriber units are provided with a special emergency telephone number button which automatically dials an emergency services number.

Again, depending upon the implementation, the emergency number dialed may be that of an emergency services center back in the home area code or perhaps the home country of the user, rather than the intended local emergency services center. Operators of the telephone system may even be deemed liable for injuries or damages that might otherwise have been avoided if the emergency services telephone number had been directed to a local emergency services center.

Problems can also arise in connection with the need of a law enforcement agency to intercept or monitor telephone calls to or from certain subscriber units. The jurisdiction of the law enforcement agency to take such action may depend upon the location of the subscriber unit-particularly upon the county, state or country in which the subscriber unit is located. For example, the law enforcement agencies of a particular country may be allowed to intercept telephone calls to or from a subscriber unit while located within their borders but not within other countries borders. For satellite-based systems, wherein the subscriber unit may be taken from one country to another, it may no longer be certain whether the law enforcement agency has proper jurisdiction to intercept telephone calls to or from the subscriber unit.

For these and other reasons, it may be desirable for a gateway or other mobile communications system to be able to direct, intercept or otherwise process telephone calls to and from subscriber units based upon the location of the subscriber unit, and aspects of the present invention are directed toward that end.

SUMMARY OF THE INVENTION

In accordance with one aspect of the invention, a mobile communications system, such as the gateway system of a satellite communications system, is configured to process telephone call connection requests from a mobile subscriber unit based, in part, upon the location of the subscriber unit. The system may, for example, be configured to parse telephone numbers received from the subscriber unit based upon the parsing scheme of the locality in which the subscriber unit is located at the time the telephone call is placed. Thus, if the user of the subscriber unit dials a local number, the dialed number will be interpreted to identify a local number in the area code region and in the country in which the subscriber unit is located, rather than a local number in the home area code region or home country of the subscriber. Such eliminates the need of the user to dial long distance area codes or international dialing codes merely to dial a local telephone number in the locality in which the subscriber is located. The system may also, for example, be configured to identify any emergency services numbers called, such as 911, and to direct such calls to the nearest emergency services center to the current location of the subscriber unit.

In one embodiment, the mobile communication system includes a means for receiving a telephone call connection request signal from a subscriber unit; a means for determining the location of the subscriber unit; and a means for interpreting the telephone call connection request signal based upon the location of the subscriber unit. The means for determining the location of the subscriber unit operates to identify a geographical area in which the subscriber unit is located. The means for interpreting the telephone call connection request signal operates to parse the request signal in accordance with the parsing scheme of the geographical area in which the subscriber unit is located. The telephone call connection request signal may be, for example, representative of an alpha-numeric character string. The geographical area may be an area code region, a country or any other appropriate geographical area or locality. If certain predetermined telephone call connection request signals are representative of emergency services telephone numbers, the means for interpreting the telephone call connection request signal operates to interpret the request signal as identifying a nearest appropriate emergency services station to the subscriber unit based upon the location of the subscriber unit.

In accordance with another aspect of the invention, a mobile communications system is configured to intercept or otherwise process telephone calls to or from a mobile subscriber unit based, in part, upon the location of the subscriber unit. The system may, for example, be configured to determine whether law enforcement agencies have requested that telephone communications to or from a particular subscriber unit be intercepted and to determine whether, based on the current location of the subscriber unit, the telephone communications can be permissibly intercepted. Thus, if the jurisdiction of a law enforcement agency to intercept a call is restricted to certain geographical areas, such as a particular country, state or county, the system determines whether the subscriber unit is within that geographical area then proceeds accordingly.

In one embodiment, the mobile communication system includes a means for processing a mobile telephone communication to or from a subscriber unit; a means for determining the location of the subscriber unit; a means for determining whether law enforcement authorities have requested that telephone communications to or from the subscriber unit are to be intercepted; a means for identifying whether the law enforcement authorities have proper jurisdiction to intercept a telephone communication to or from the subscriber unit based upon the location of the subscriber unit; and a means, responsive to an identification that law enforcement authorities do have jurisdiction, for intercepting a telephone communication to or from the subscriber. The means for determining whether law enforcement authorities have requested that telephone communications from the subscriber unit are to be intercepted and the means for identifying whether the law enforcement authorities have proper jurisdiction include means for examining a database identifying subscriber units subject to telephone communication interception, for identifying the law enforcement agency requesting the interception and for identifying the geographical areas wherein the law enforcement agency has jurisdiction to intercept telephone communications.

In the various embodiments of the invention, the subscriber unit may be any device having wireless telephony capability such as a mobile telephone, a personal data assistant, a dedicated Internet access device, an electronic organizer and a laptop computer. The mobile communication system may process the mobile telephonic communications in accordance with any appropriate mobile telephony processing technique such as, for example, Code Division Multiple Access (CDMA). Furthermore, the telephone call connection request signal may specify any type of telephonic communication including, for example, voice communications, data communications or combined voice and data communications.

The invention may also be implemented as a method or any other appropriate type of inventive embodiment.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 8 is a block diagram of a parsing table of the system of FIG. 7;

FIG. 9 is a block diagram of an emergency services telephone number and location table of the system of FIG. 7;

FIG. 12 is a block diagram of a lawful intercept request table of the system of FIG. 11; and FIG. 13 is a block diagram of an law enforcement jurisdiction table of the system of FIG. 11.

DETAILED DESCRIPTION OF THE PREFERRED EMBODIMENTS

With reference to the remaining figures, preferred and exemplary embodiments of the invention will now be described. Initially, embodiments directed to selecting service providers for handling mobile telephone calls based upon subscriber unit location information and user preferences are described with reference to a satellite-based mobile communication system illustrated in FIGS. 3–5. Then, embodiments directed to processing telephone calls based on location information to, for example, parse telephone numbers based on the parsing scheme of the locality in which a subscriber unit is located, are described with reference to FIGS. 6–13. The preferred embodiments of the invention conduct connection processing in accordance with the IS-41 standard, the use of which is well known in the art.

Service-Based Selection.

Figure 3A:
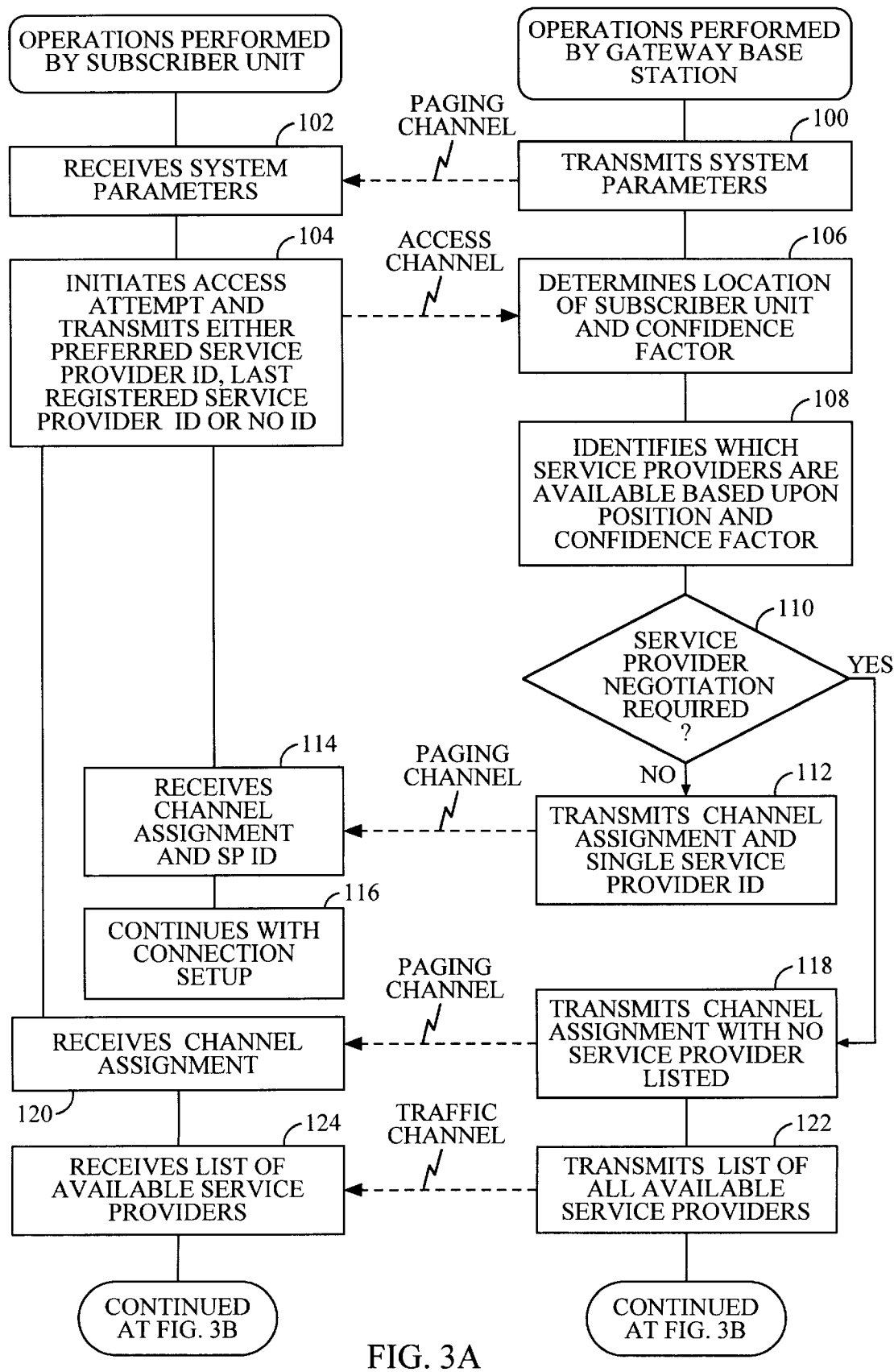
FIGS. 3A and 3B together provide a flow-chart illustrating a method, in accordance with a first exemplary implementation of the invention, for selecting a service provider for a satellite-based mobile telephone system employing a gateway ground station.
Figure 3B:
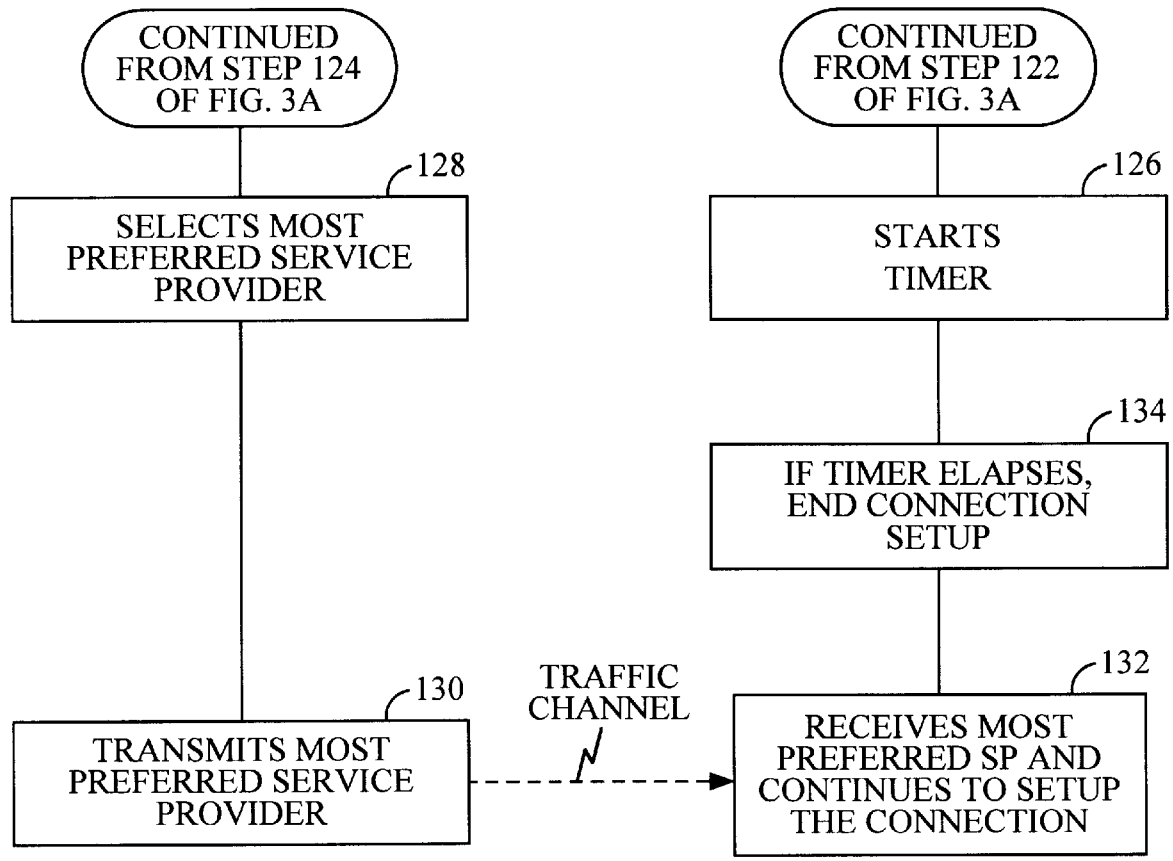

The flow chart of FIGS. 3A and 3B illustrates operations performed during initiation of a connection from a subscriber unit. The figure illustrates, in tandem, both operations performed by the subscriber unit and those performed by the gateway ground station. Transmissions between the subscriber unit and ground station are represented by dashed arrows. All such transmissions are achieved by transmitting signals up to one or more satellites which relay the signals back to earth.

Initially, at step 100, the ground station transmits system parameters over a paging channel which identify the gateway (by gateway_id), the service providers connected by the gateway (by service_id) and any other appropriate system parameters such as satellite beam_id. The system parameters are transmitted repeatedly and periodically such that any subscriber unit in the coverage area of the ground station may receive the information. The list of service providers transmitted specifies every service provider connected to the gateway including service providers which may not be available for use by the subscriber unit at its current position because of, for example, operational or contractual limitations.

At step 102, the subscriber unit receives the system parameters over the paging channel. This step is typically performed when the subscriber unit is powered-up. The user then attempts to initiate a telephone call or other telephonic connection at step 104 at which time the subscriber unit transmits access information over an access channel including access registration requests, origination information, and channel requests. The subscriber unit also transmits a preferred service_provider_ID, if available, and a registration bit. In this regard, the subscriber unit first accesses a preferred service provider table or other data base (not shown) within the subscriber unit which identifies the preferred service provider. Depending upon the implementation, the subscriber unit may store only a single preferred service provider, a different preferred service provider for each gateway coverage area, or perhaps different preferred service providers for different times of the day or for different dates etc. If there is no preferred service provider listed, the mobile telephone transmits the ID of the service provider the mobile telephone was last registered with, perhaps as a result of a previous telephone connection, or simply does not transmit any service provider ID. If the subscriber unit transmits the ID of last registered service provider, the subscriber unit also transmits a registration bit of 1; otherwise the registration bit is transmitted as 0. If no preferred or last-registered service providers are available, the mobile telephone does not transmit any service provider information. In other implementations, the subscriber unit may transmit multiple service provider ID's ordered according to preference or may transmit service_provider_ID's that the subscriber unit, for some reason, cannot or will not allow itself to be connected to.

At step 106, the gateway receives the access channel signals and attempts to determine the location of the subscriber unit to thereby determine what service providers are available for handling connections from the subscriber unit. In one embodiment, the satellites transmit to the gateway information representative of the relative time delays and frequency shifts of signals received from the subscriber unit by one or more satellites. Using that information and the information identifying the location of the satellites, the gateway approximates the location of the subscriber unit. Various methods for performing position location in a satellite based wireless communication systems are described in US patents applications entitled "Unambiguous Position Determination Using Two Low-Earth Orbit Satellites" having application Ser. No. 08/723,725, Position Determination Using One Low-Earth Orbit Satellite" having application Ser. No. 08/723,751. "Passive Position Determination Using Two Low-Earth Orbit Satellites" having application Ser. No. 08/723,722, "Ambiguity Resolution For Ambiguous Position Solutions Using Satellite Beams" having application Ser. No. 08/723,723, Determination Of Frequency Offsets In Communication Systems" having application Ser. No. 08/723,724 all assigned to the assignee of the present invention and incorporated herein by reference.

The gateway also assigns a confidence factor or level identifying how reliable or accurate the location determination is. The confidence level may be low when the location is determined using the above-described techniques employing relative time and frequency calculations. Nevertheless, the confidence level is typically at least sufficient to reliably identify the subscriber unit as being in a particular country or within a particular service provider region within a country. In the embodiment to be discussed below wherein GPS techniques are employed, the location determination may be very precise and the confidence factor thereby very high.

At step 108, the gateway determines which service providers are available for handling the telephone connection initiated by the subscriber unit based on the location of the subscriber unit. In this regard, the gateway accesses a service provider location table which represents the range of locations that each service provider handled by the gateway can cover. The range of locations may be represented, for example, as ranges of latitudes and longitudes. As noted, the range of locations may be affected by contractual or other legal constraints or by physical operating constraints. In any case, the gateway compares the location of the subscriber unit with the service provider coverage information of the database and identifies those service providers that are available.

The determination of the availability of a service provider may be affected by the confidence factor of the location determination. For example, if the location of the subscriber unit is found to be near a border or other dividing line between two service provider coverage areas but confidence level is low such that the system cannot be certain which coverage area the subscriber unit is in, it may be necessary, perhaps on contractual grounds, to declare that neither service provider is available and that the telephone connection therefore cannot be completed. In other implementations, any service provider that has a coverage area that the subscriber unit might be in is identified as being available. Thus, if the subscriber unit is determined to be in Germany but the confidence level is so low that the subscriber unit may actually be in France instead, the gateway designates all appropriate French or German service providers as being available. Other variations and implementations are possible as well.

In this manner the gateway identifies a list of available service providers, if any. If the subscriber unit transmits a preferred service provider ID, the gateway determines if the preferred service provider is among the available service providers and eliminates all others. If the subscriber unit transmits a list of service providers that are unacceptable, the gateway eliminates any from the list of available service providers for that subscriber unit. If the subscriber unit transmits a list of acceptable service providers ordered by preference, the gateway picks the most preferred. If the subscriber unit does not transmit a preferred service provider, but instead transmits the last registered service provider as identified by the set registration bit, and that provider is on the list, the gateway eliminates all other entries. Ultimately, this process yields a list of available service providers that either has no entries, one entry or multiple entries.

Next, the gateway determines at step 110 whether it needs to negotiate with the subscriber unit to allow selection of a single service provider. If either no service providers or only a single service provider remains on the list of available service providers, then no negotiation is needed. If none remain, a signal is sent to the subscriber unit indicating that connection setup cannot proceed. If more than one service provider remains on the list, then the gateway negotiates with the subscriber unit to allow the subscriber unit to select one the available service providers.

If it is determined that no negotiation is required, at step 110, then execution proceeds to step 112, where the gateway assigns a traffic channel for the mobile telephone and transmits a traffic channel assignment information on the paging channel to the subscriber unit. In the preferred embodiment, the traffic channel is a private non-shared signaling and user-traffic-bearing channel. The traffic channel assignment information includes an identification of the single service provider identified by the gateway. The subscriber unit receives the traffic channel assignment information identifying the service provider at step 114 and proceeds with connection set-up at step 116. In some implementations, the subscriber unit may store a list of unacceptable service providers and, if the service provider identified in the traffic channel assignment message is unacceptable, the subscriber unit aborts the telephone connection or notifies the gateway that the service provider is unacceptable.

If it is determined that negotiation is required, at step 110, then execution proceeds to step 118, where the gateway assigns a traffic channel for the mobile telephone and transmits a traffic channel assignment information on the paging channel to the subscriber unit without a service provider ID. The subscriber unit receives the transmitted information at step 120. Thereafter, the gateway transmits on the traffic channel, at step 122, the list of acceptable service providers. The mobile station receives the list of available service providers at step 124. Referring now to FIG. 3B, after the transmission, the gateway sets a timer, step 126. The subscriber unit selects the most preferred one of the service providers at step 128 by comparing against a prestored list, and transmits the corresponding service provider ID at step 130 which the gateway receives at step 132 on the assigned traffic channel. If the timer set at step 126 expires before the gateway receives the most preferred service provider at step 132, the gateway terminates connection setup at step 134 and step 132 is therefore not executed. It should be noted that in the preferred embodiment of the invention, steps 118–134 are only required if the subscriber unit does not initially transmit preferred service provider information at step 104 such as if a suitable service provider cannot be determined during steps 104–110.

Hence, the subscriber unit and gateway together perform steps for selecting an appropriate service provider based upon the location of the subscriber unit and any preferences specified by the subscriber unit. Once the selection is established, the subscriber unit and gateway proceed with processing the telephone connection. In one embodiment of the invention, the location of the subscriber unit is updated periodically during the connection, and, if the subscriber unit is found to have traversed into an area wherein the original service provider is no longer available, the gateway and subscriber unit re-negotiate for a new service provider and the appropriate steps of FIG. 3 are repeated. Preferably these steps are performed without disrupting the mobile communication in progress. In some situations, however, it may be necessary to terminate the connection if a new available service provider cannot be found.

Figure 1:
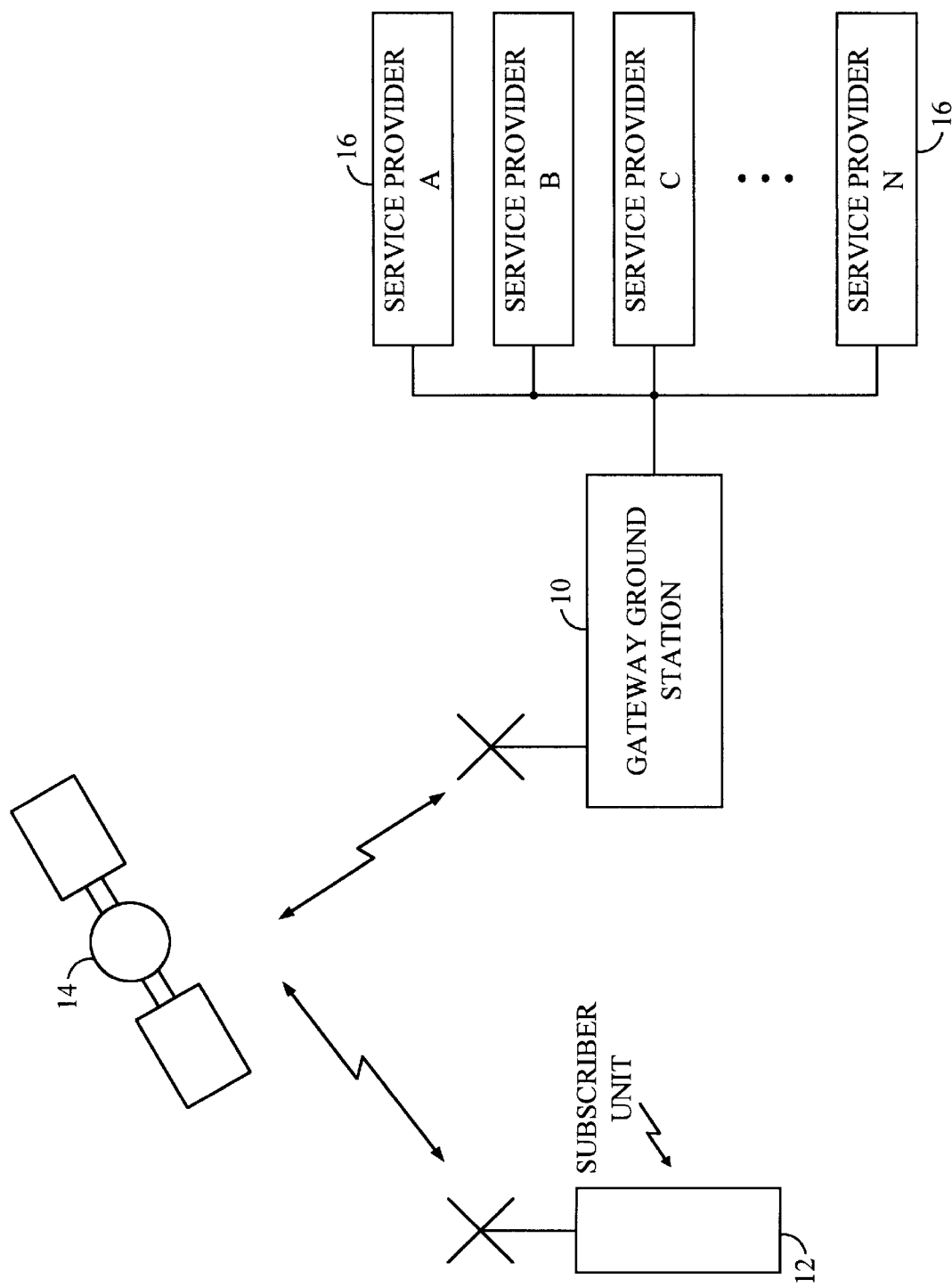
FIG. 1 is a diagram representing a satellite-based mobile telecommunications system employing a gateway ground station.
Figure 2:
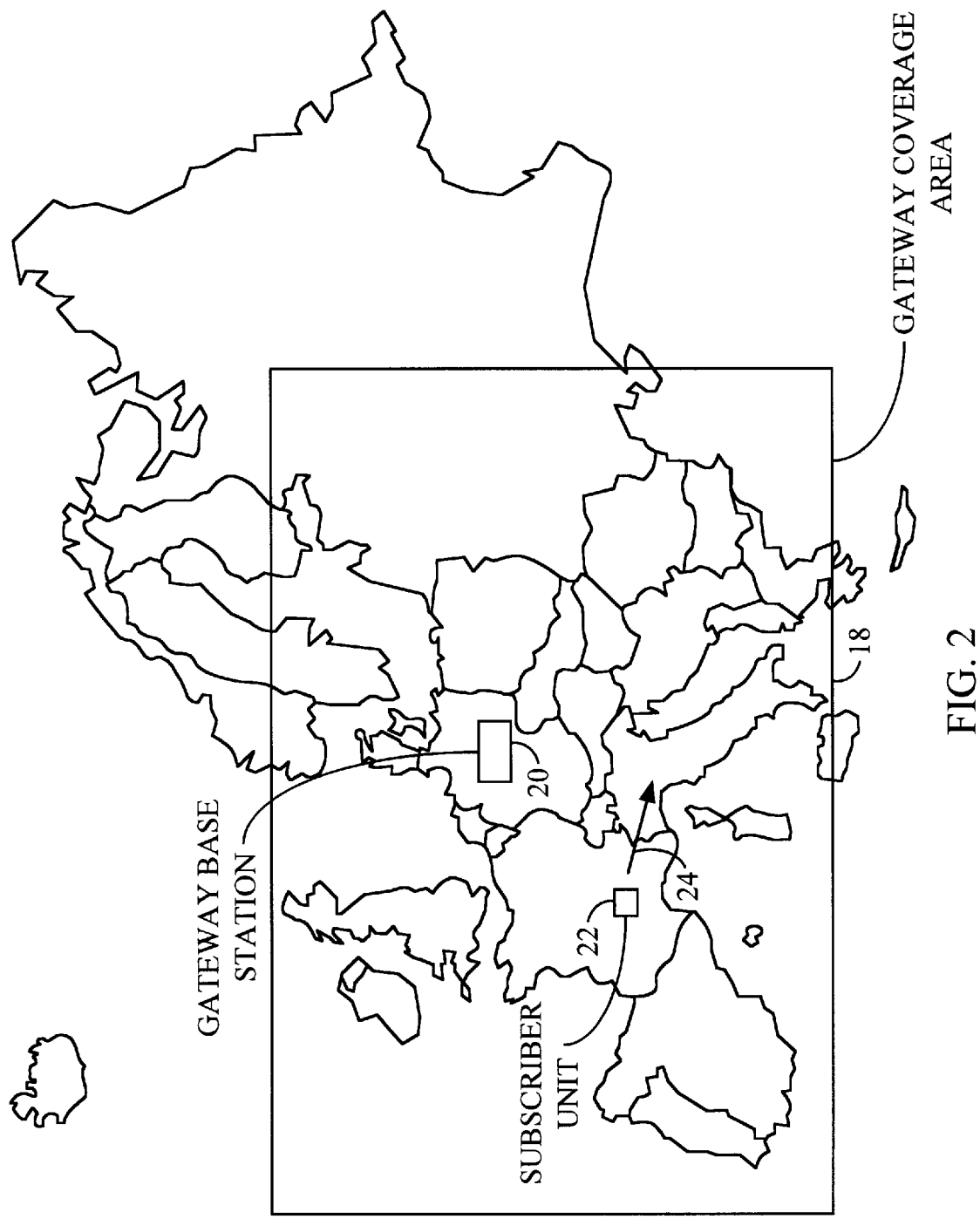
FIG. 2 is a diagram representing an exemplary coverage area for a single gateway ground station of the system of FIG. 1.
Figure 4:
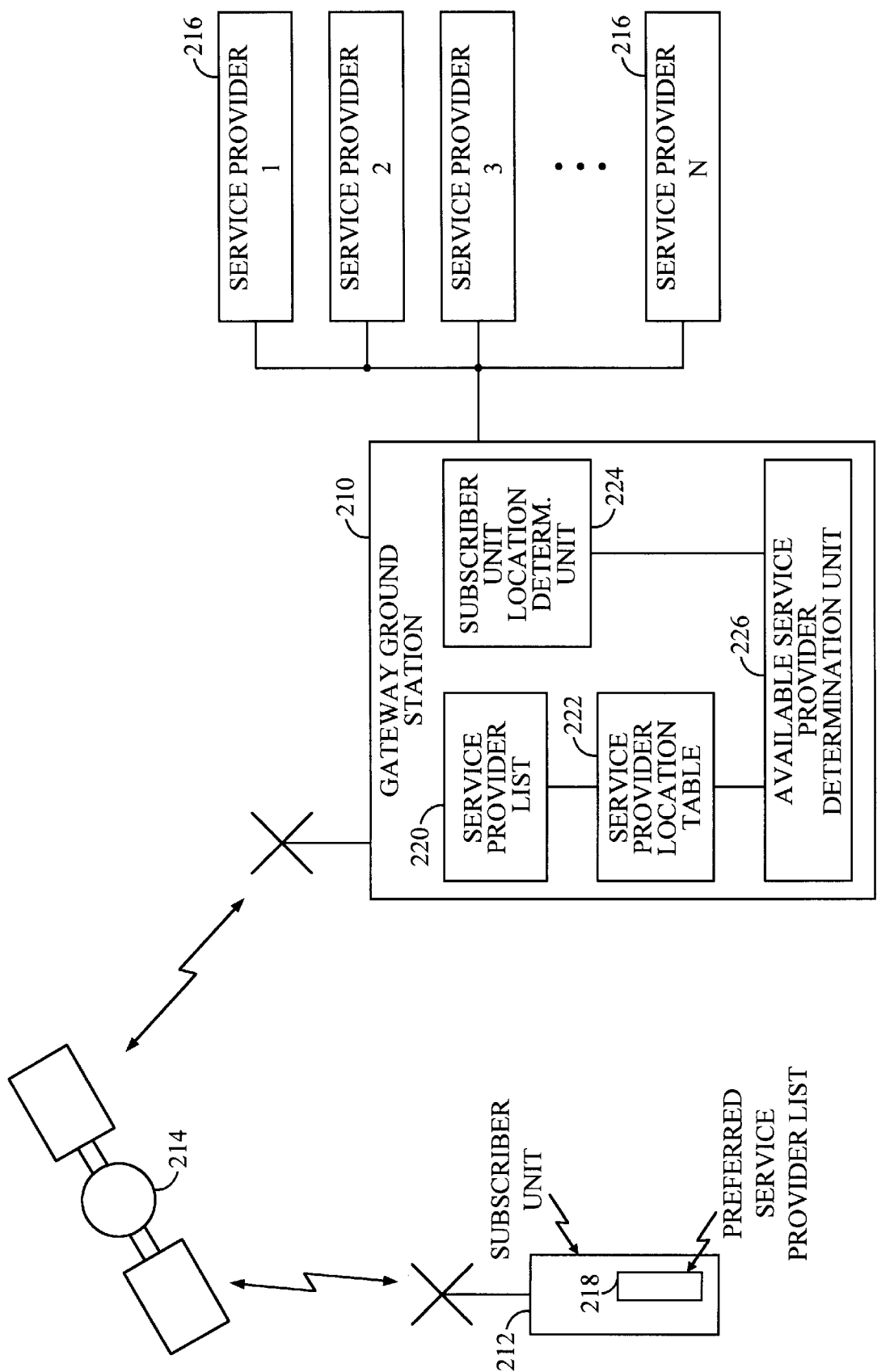
FIG. 4 is a diagram representing the satellite-based mobile telephone system performing the method of FIGS. 3A and B and having means within the gateway ground station of the system for determining the location of a subscriber unit.

FIG. 4 illustrates pertinent components of a satellite-based system configured to perform the steps of FIGS. 3A and 3B. The system is similar to that of FIG. 1, with like components identified by like reference numerals incremented by 100, and only pertinent differences will be described in detail. A gateway ground station 210, subscriber unit 212 and satellite 214 are shown. Signals are transmitted between the subscriber unit and the gateway via the satellite. The gateway is also interconnected to a set of service providers, generally denoted 216, which provide an interconnection to local land line telephone networks or other communication networks.

Subscriber unit 212 includes a preferred service provider list 218 for use in selecting a preferred service provider. As noted above, an ID of the preferred service provider is transmitted to gateway 210 either as part of an access request over the access channel or in response to query from the gateway over received over the paging channel. Depending upon the implementations, the preferred service provider list may identify only a single service provider, a single service provider per gateway or perhaps a single service provider per country or area. The list may also identify service providers in order of preference. The list may also identify service providers that the user of the subscriber unit would prefer not to use including ones that, for one reason or another, the user will not or cannot access. Also depending upon the implementation, the service provider preference list is programmed by the subscriber unit manufacturer, point of sale personnel or the user. If the latter, the subscriber unit is provided with circuitry or software for receiving preferred service provider information from the user, perhaps input through a keypad of the subscriber unit or perhaps selected from a list presented to the user of a set of pre-stored permissible service providers. The database may alternatively be updated electronically via a dataport or updated based upon signals received via mobile communications from a gateway. In each case, all permissible service provider ID's are pre-stored such that the user need not know the ID's. Rather, the user need only know the name of the service provider. As can be appreciated, a wide variety of implementations are available in accordance with the principles of the invention.

Gateway 210 includes a service provider list 220 identifying all service providers connected to the gateway, a service provider location table 222 identifying the permissible coverage areas for each service provider of list 220, a subscriber unit location determination unit 224 and an available service provider determination unit 226. The subscriber unit location determination unit identifies the location of the mobile and applies that information to location table 222 to identify those service providers available for handling telephonic connections for subscriber units at that location. As noted above, the ability of a service provider to handle connections may be subject by contractual other legal constraints. Also as noted, the location of the subscriber unit is determined subject to some degree or accuracy or confidence factor. The confidence factor may be employed, in the manner discussed above, by the available service provider determination unit 226 in identifying the acceptable service providers.

After a list of acceptable service providers is generated, gateway 210 performs the steps described above to negotiate, if necessary, with subscriber unit 212 to allow selection of one of the service providers. Once a service provider has been selected, the gateway routes signals between the subscriber unit and the selected service provider for further processing of the telephone connection. Subsequent telephone connections initiated by the subscriber unit require re-identification of a service provider, which may or may not be a different service provider than the previous one selected.

Figure 5:
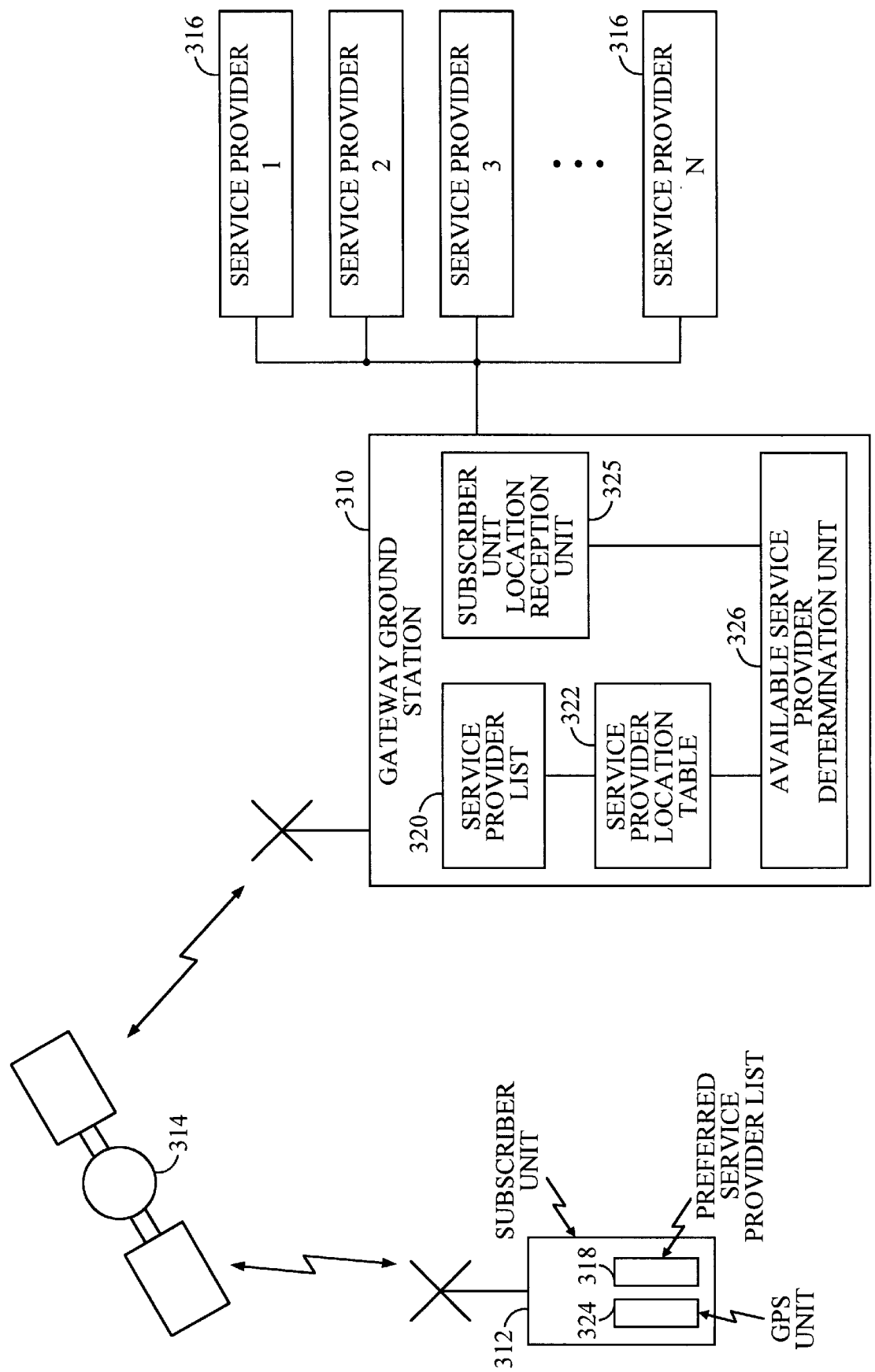
FIG. 5 is a diagram representing an alternative satellite-based mobile telephone system similar to that of FIG. 4 but wherein the subscriber unit includes the means for determining location.

FIG. 5 illustrates pertinent components of a system similar to that of FIG. 4, (with like components identifies by like reference numerals incremented by 100), but wherein the subscriber unit includes a GPS unit for determining location. Only pertinent differences will be described in detail.

A subscriber unit 312 is shown including a GPS unit 324 for determining the current location of the subscriber unit. GPS unit 324 determines the location of the subscriber unit in accordance with conventional GPS techniques and in connection with a fleet of GPS satellites (not separately shown). The location may be determined prior to initiation of a telephone connection or may be provided in response to a query from the gateway. In either case, once the location is determined, the subscriber unit transmits coordinates identifying the location to a gateway 310 to allow the gateway to determine which service providers are available for that location. The gateway then proceeds in the manner described above with reference to FIG. 3 to negotiate with the subscriber unit, if necessary, to select one of the service providers.

Thus far techniques of the invention have been described with reference to a telephone connection initiated by a subscriber unit. Similar techniques are performed for subscriber unit terminated connections. Also, similar techniques are performed to register a subscriber unit upon power up and to update registration periodically. Further, similar techniques may be performed for other mobile communications besides telephone calls.

What has been described thus far is a system for selecting service providers for a mobile telephone system wherein selection is based upon location and user preferences. As noted, other selection criterion may also be employed consistent with the principles of the invention. For example, selection may be based, in whole or in part, upon the transmission frequency used, the time of day or date, or other factors. The subscriber unit may store information specifying rate schedules for different service providers and select preferred service providers based upon the current lowest rate. Also, selection may be based upon exclusive factors, rather than on inclusive factors. In this regard, the selection process may select all service providers not otherwise specifically excluded, perhaps as a result of billing issues with respect to specific mobile users. As far as location-based or position-based selection is concerned, the position need not merely be limited to lat./long. positions on the ground. Selection may be further based upon altitude, velocity or speed. For example, different discrimination factors may be employed to select preferred service providers for subscriber units in airplanes, boats or trains than for hand-held subscriber units carried on foot or in a car. As to velocity, because velocity includes a directional vector, a service provider can be selected that will be able to provide the longest service given the subscriber unit's speed and direction. For example, if the subscriber unit is in an aircraft initially over a geographical area wherein two service providers are available, but moving in a direction where only one of the two will soon be available, the system will select that service provider as the better service provider for that particular mobile communication. In general, principles of the invention may be applied to perform service provider selection based upon any suitable factor. Further, principles may apply to selection of other operating characteristics besides service providers, as well. Also, the principles of the invention are not limited to satellite-based mobile communications systems but are applicable to other communications systems as well.

Location-Based Parsing of Telephone Numbers

With reference to FIGS. 6–9, embodiments of the invention directed to parsing telephone numbers received from a subscriber unit based upon the location of the subscriber unit will be described. Briefly, the gateway ground station detects a short telephone number string, such as a string without an area code, and interprets the short string as a local telephone number within the locality of the subscriber unit.

Figure 6:
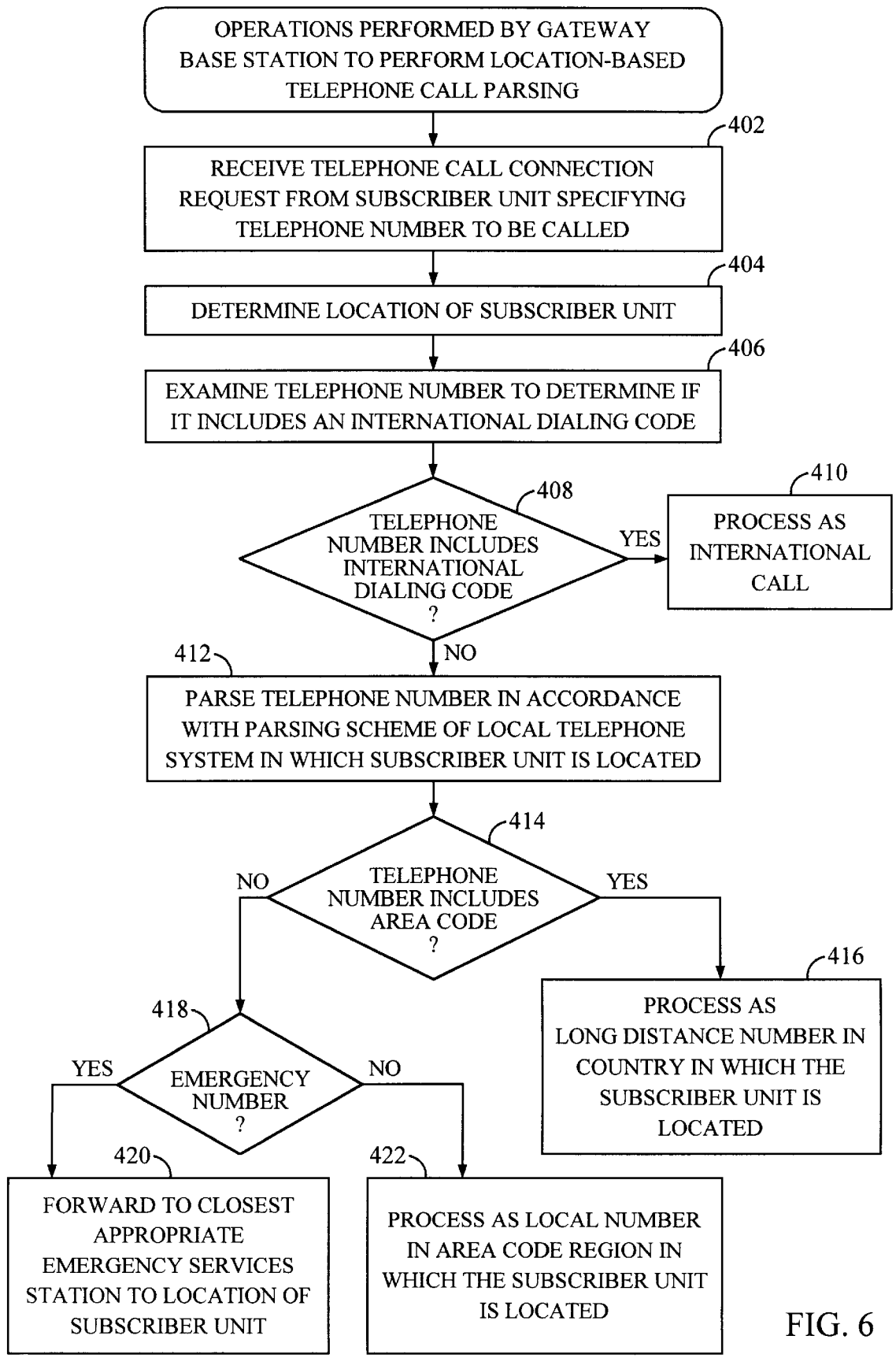
FIG. 6 is a flowchart illustrating a method, in accordance with a second exemplary implementation of the invention, for interpreting a dialed telephone number received from a subscriber unit based, in part, upon the location of the subscriber unit.

FIG. 6 illustrates steps performed by the gateway ground station. Initially, at step 402, the ground station receives a telephone call connection request (or any other mobile telephony connection request) from a subscriber unit. The connection request specifies a telephone number that the user of the subscriber unit wishes to contact, perhaps to establish a voice telephone call or a data communication call. The telephone number may be any of a variety of lengths. For example, the telephone number may be a seven digit local U.S. telephone number, a nine digit long distance U.S. telephone number or a longer international telephone number. The telephone number may alternately be of a wide variety of other lengths, particularly if the number being dialed is directed to a telephone number in another country having different standard telephone number lengths. Also, the length of the number may differ if it is a directory assistance number (such as the common U.S. directory assistance number "411"), a telephone repair assistance number (such as the common U.S. repair number "611"), an emergency services number (such as the common U.S. emergency number "911" or the common U.K. emergency number "999"), or the like.

At step 404, the ground station determines the location of the subscriber unit. This may be accomplished using any suitable technique including the above-described techniques of receiving a fairly precise GPS-based location from the subscriber unit or receiving a somewhat approximate location as determined by the fleet of satellites. Although shown as occurring following the reception of the telephone number, the determination of the location of the subscriber unit may be made prior to reception of the telephone number or may be contemporaneous therewith. The location may be specified in any suitable manner including latitude and longitude components or predefined location grid components.

Once the location of the subscriber unit has been determined, the ground station interprets the received telephone number in accordance with the location as follows. At step 406, the ground station parses the telephone number and determines, at step 408, whether it includes an international dialing code. If so, step 410 is performed wherein the telephone number is processed as an international call by, for example, forwarding the call to the appropriate international operator for call completion. In some cases, the user may have unnecessarily entered an international dialing code. For example, the user may be located within the country specified by the international dialing code. If so, the system simply removes the international code from the telephone number and forwards the remaining digits of the telephone number to the local PSTN for call completion. If at step 408, it is determined that the telephone number does not include an international calling code, then step 412 is performed wherein the telephone number is parsed in accordance with the local telephone system parsing rules in the vicinity of where the subscriber unit is located to determine whether it is a local number, a long distance number or an emergency services number. Hence, if the subscriber unit is located in the U.S., the telephone number is parsed in accordance with U.S. PSTN parsing schemes. If the subscriber unit is in India, for example, the telephone number is parsed in accordance with the India telephone system parsing scheme. Such parsing may be performed in accordance with conventional techniques. Exemplary parsing tables and techniques for the U.S. and India are described in co-pending U.S. patent application Ser. No. 08/609,924, filed Feb. 29, 1996, entitled "Telephone Number Parser for Wireless Local Loop Telephones", which is incorporated herein by reference. Many local telephone number systems accommodate a wide range of telephone number configurations and access codes. Hence, complete parsing may be complicated. However, complete parsing typically need not be performed. Rather, for the method of FIG. 6, it is sufficient simply to determine whether the telephone number is a local number, a long distance number or is an emergency services number.

If, at step 414, the telephone number is determined to be a long distance number (e.g. the telephone number includes an area code or other appropriate long distance identifier), then step 416 is performed wherein the telephone number is processed as a long distance number in the country in which the subscriber unit is located. As before, the user may have unnecessarily entered a long distance area code even though the user is located in the area specified by the code such that the telephone number being dialed is actually a local number. Again, the system merely removes the unnecessary area code and forwards the remaining digits to the local PSTN for call completion. The specific action performed depends upon the configuration of the local PSTN.

If, at step 414, the telephone number does not include an area code, then the ground station determines, at step 418, whether the digits of the telephone number represent an emergency number such as 911 or 999. If so, then at step 420, the ground station identifies the closest appropriate emergency services center to the location of the subscriber unit and connects the call to that center. If not, then at step 422, the ground station process the telephone number as a local call.

As to the emergency services numbers, the ground station maintains a list of all or most emergency services numbers (such as 911 or 999) in use anywhere in the world and compares the received telephone number to the list to identify whether the number corresponds to one of the emergency services numbers. In this manner, the user need not know the appropriate emergency services number in the country or locality in which he or she is currently located. Rather the user may simply use whatever emergency services code he or she is familiar with. Hence, a user from the U.K. may dial 999 in the U.S. and be connected to the local 911 operator. If there is any ambiguity, perhaps because a telephone number used as an emergency services number in one country is used for other purposes in the locality in which the user in located, then the system may further verify that the user wishes to be connected to an emergency services operator before completing the call. In this regard, the system may be configured to send an automatic voice message to the subscriber unit requesting verification.

As noted, emergency calls are connected to the nearest appropriate emergency services center to the location of the subscriber unit. In this regard, the ground station maintains a database identifying the locations of emergency services centers and compares the location of the subscriber unit with the database to identify the closest emergency services center. In this manner, the user is not improperly connected with a distant emergency services center. By "appropriate" emergency services center, it is meant that the ground station determines whether the emergency telephone number specifies any particular emergency service and forwards the call to the closest such service. For example, in locations or countries where there are separate emergency numbers for fire, ambulance, police, etc., the ground station connects the call to the closest appropriate center. In localities where a single emergency code is employed (such as 911), the call is merely connected to the nearest emergency operator to the location of the subscriber unit. In the method of FIG. 6, the received telephone number is only examined to determine if it is an emergency services number if it is a local number (i.e. if it has no international code or long distance code.) In other implements, all numbers, including those having area codes or international codes, may be examined to determine if they are emergency services numbers.

Hence, the ground station identifies an emergency services number, even if it is not of the type normally employed in the location of the subscriber unit, and forwards the call to the nearest appropriate emergency services center. As such the user need not know the correct emergency services code for the country or location that he or she is in, thereby possibly saving considerable time in an emergency situation. Some mobile telephones or other subscriber units have dedicated emergency call buttons which transmit an appropriate emergency number, such as 911, or other signal. Such a signal is also detected and a telephone connection is made to the nearest appropriate emergency services center.

Also, as described, the system detects whether the number dialed is a local number and, if so, processes the number as a local number in the location in which the subscriber is located, thus freeing the user from the need to dial a long distance or international telephone number to contact a local telephone number.

Figure 7:
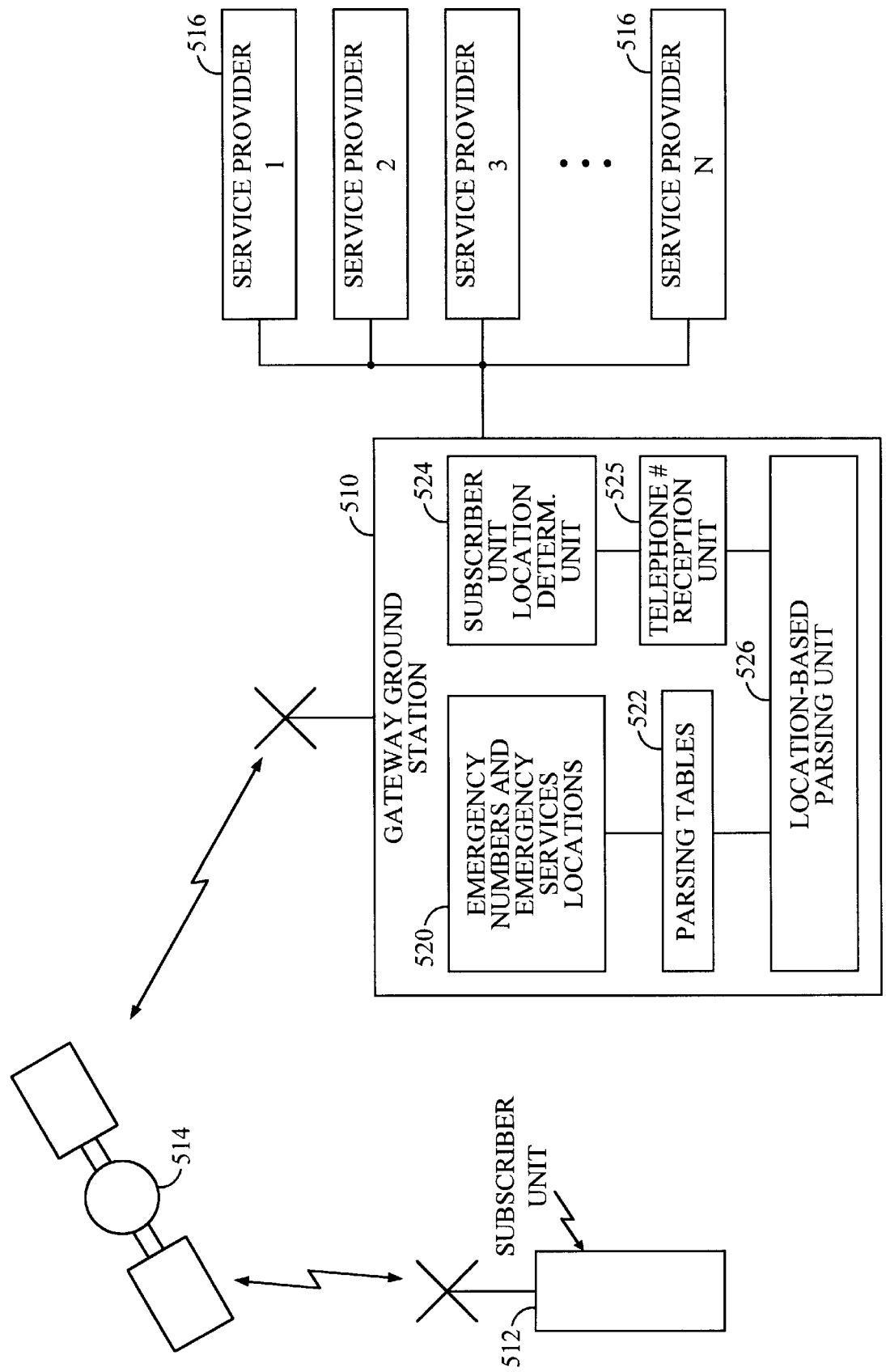
FIG. 7 is a diagram representing a satellite-based mobile telephone system performing the method of FIG. 6.

FIGS. 7–9 illustrate pertinent components of a satellite-based system configured to perform the steps of FIG. 6. The system is similar to that of FIG. 5, with like components identified by like reference numerals beginning with reference numeral 510, and only pertinent differences will be described in detail. FIG. 7 illustrates a ground station 510, an exemplary subscriber unit 512 and an exemplary satellite 514. The subscriber unit includes a subscriber unit location determination unit 524 which receives signals identifying the location of the subscriber unit, a telephone number reception unit 525 which receives a telephone number from the subscriber unit and a parsing unit 526 which parses or otherwise interprets the telephone number based upon the location of the subscriber unit using the method of FIG. 6. To this end, parsing unit 526 accesses a set of parsing tables 522 and an emergency services number and location table 520. Parsing table 520, shown in greater detail in FIG. 8, includes, for each country or other entity having a separate parsing scheme, the range of locations wherein the scheme is employed and information regarding the parsing scheme itself. Parsing unit 526 (FIG. 7), compares the location of the subscriber unit with the ranges of locations in table 522 and outputs the appropriate parsing scheme for use in determining whether the telephone number received is a local number, a long distance number, etc. Table 522 may include, for example, one entry for the United States identifying the geographical boundaries of the U.S. and a set of parsing scheme records specifying that local numbers within the U.S. have seven digits, long distance number have eleven digits, and international numbers are prefaced by 01. A separate entry may be provided for each separate country or location, such as Mexico. Alternatively, for countries sharing the same basic parsing scheme, such as the U.S. and Canada, a single common entry may be provided having a range of locations specifying both countries. The ranges of locations may be specified by a set of latitudes and longitudes or perhaps by a set of grid coordinates.

Hence, the ground station applies the location of the subscriber unit to table 522 to determine the appropriate parsing scheme. As noted, the parsing scheme is employed to determine whether the received telephone number is a local number, a long distance number or an international number. If the location is not within one of the countries listed, such as if the user is on a boat or aircraft, then the system may select the closest likely country or may merely require that the user enter a full international telephone number.

FIG. 9 illustrates emergency number table 520 employed to determine whether a received telephone number is an emergency services number. For each emergency services number, such as 911 or 999, the table stores the locations and direct telephone connection numbers (if applicable) of each of the corresponding emergency services centers. The ground station compares the received telephone number with the listed emergency services numbers and, if there is a match, directs the call to the closest appropriate emergency services center to the location of the subscriber unit. Hence, if the user dials 911 in the U.S., the ground station thereby identifies 911 as an emergency access number and identifies the closest 911 emergency operator to the location of the subscriber. The call is then directed to that particular 911 operator. The table additionally lists 999 in connection with U.S. emergency services centers such that, if a user dials 999 in the U.S., that number is also identified as an emergency number and the call is forwarded to the nearest 911 operator. Preferably, all appropriate emergency services numbers used world wide and all appropriate emergency services stations are stored and cross-referenced as need to ensure that the user is connected to the closest appropriate emergency services center, whether it be a fire department, hospital, police department or general emergency operator. As can be appreciated, emergency number table 520 and the various other tables described herein can be configured and cross-referenced in accordance with a wide range of techniques.

Location-Based Coordination of Lawful Intercepts

With reference to FIGS. 10–13, embodiments of the invention directed to coordinating lawful interception of telephone calls to or from a subscriber unit based upon the location of the subscriber unit will be described. Briefly, the gateway ground station maintains a list of subscriber units subject to lawful intercept and the jurisdiction in which such an interception is proper, verifies that the subscriber unit is at a location where jurisdiction is proper and, if so, intercepts, records, blocks or otherwise processes the telephone call in accordance with instructions provided by the requesting law enforcement agency.

Figure 10:
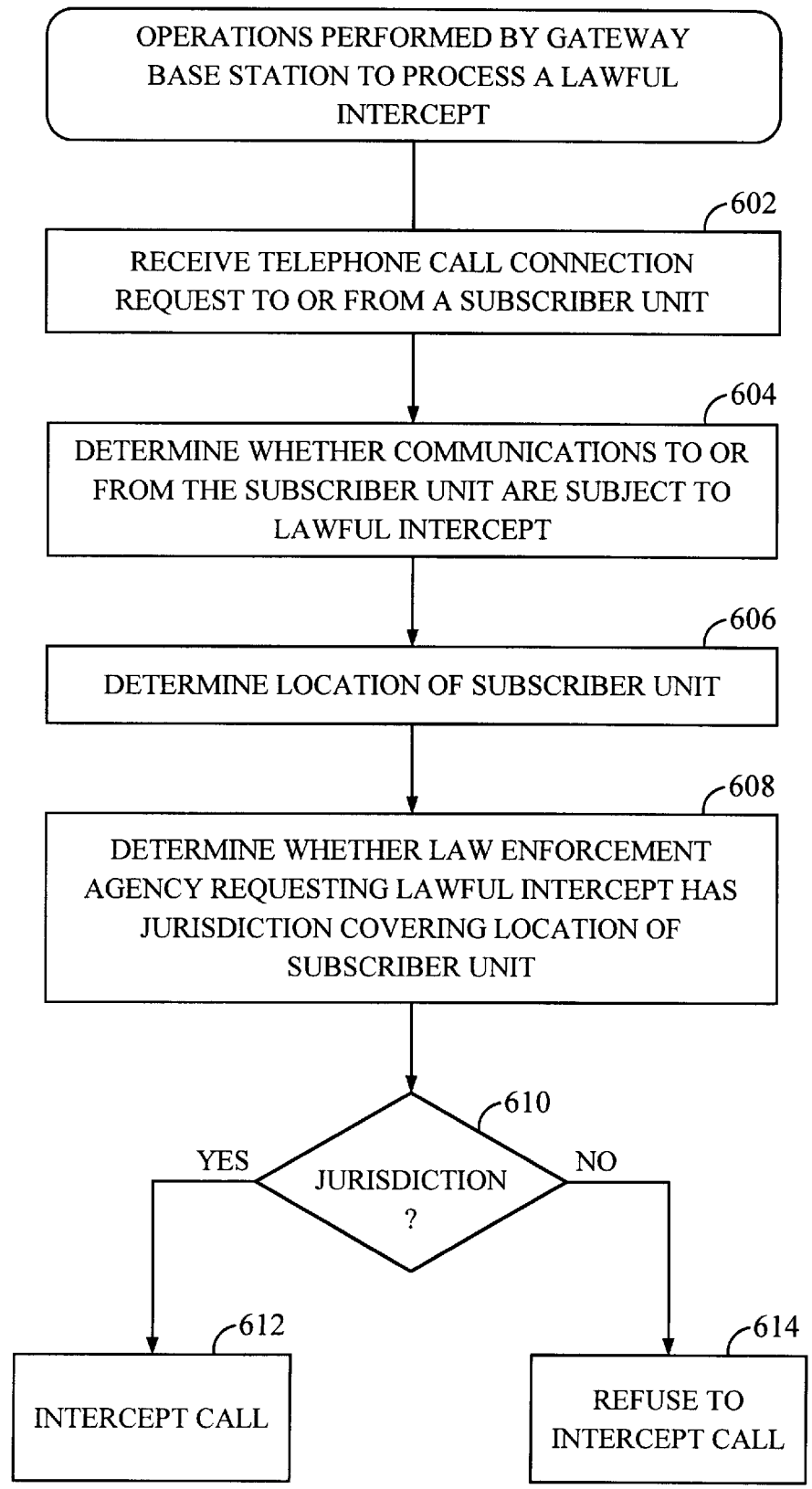
FIG. 10 is a flowchart illustrating a method, in accordance with a third exemplary implementation of the invention, for coordinating lawful intercept of telephone calls to or from a subscriber unit based, in part, upon the location of the subscriber unit.

FIG. 10 illustrates steps performed by the gateway ground station in furtherance of lawful intercept processing. Initially, at step 602, the ground station receives a telephone call connection request (or any other mobile telephony connection request) either from a subscriber unit or to a subscriber unit. If the call is to a subscriber unit, it may be from another subscriber unit, a conventional fixed land phone or any other device capable of establishing telephonic contact with the subscriber unit. In any case, the incoming "mobile terminated" call includes signals uniquely identifying the subscriber unit being called—perhaps by its unique telephone number, Internet Protocol (IP) address, or the like. If the call is outgoing (i.e. a "mobile initiated call"), the subscriber unit includes signals, provided along with the telephone number being dialed, that identify itself.

At step 604, the ground station determines whether communications to or from the subscriber unit are subject to a lawful intercept or other similar action. This is achieved, as will be described below, by accessing a database table listing subscriber units subject to such intercepts. Then, at step 606, the ground station determines the location of the subscriber unit. This may be accomplished using any suitable technique. Also, although shown as occurring following the determination of whether the call is subject to interception, the determination of the location of the subscriber unit may be made prior thereto or may be contemporaneous therewith.

Next, at step 608, the ground station compares the location of the subscriber unit with the ranges of locations in which the requesting law enforcement agency has proper jurisdiction and thereby determines whether the telephone call can be lawfully intercepted. If jurisdiction is proper, step 610, then the call is intercepted or any other appropriate action requested by the law enforcement agency is performed, step 612. If jurisdiction is not proper, the intercept is refused, step 614. In either case, the telephone call typically proceeds. Usually, if the call is intercepted, such action is unbeknownst to the parties involved in the call. In other cases, however, the telephone call may simply be blocked. As an example, one party may have a court order to prevent another party from calling him or her, perhaps to prevent stalking or harassment. Such a court order may apply in one state but not another. Hence if the subscriber unit has moved into another state, blocking may not be legally permissible. As such, the system determines the location of the subscriber unit and performs automatic blocking depending upon its location.

Figure 11:
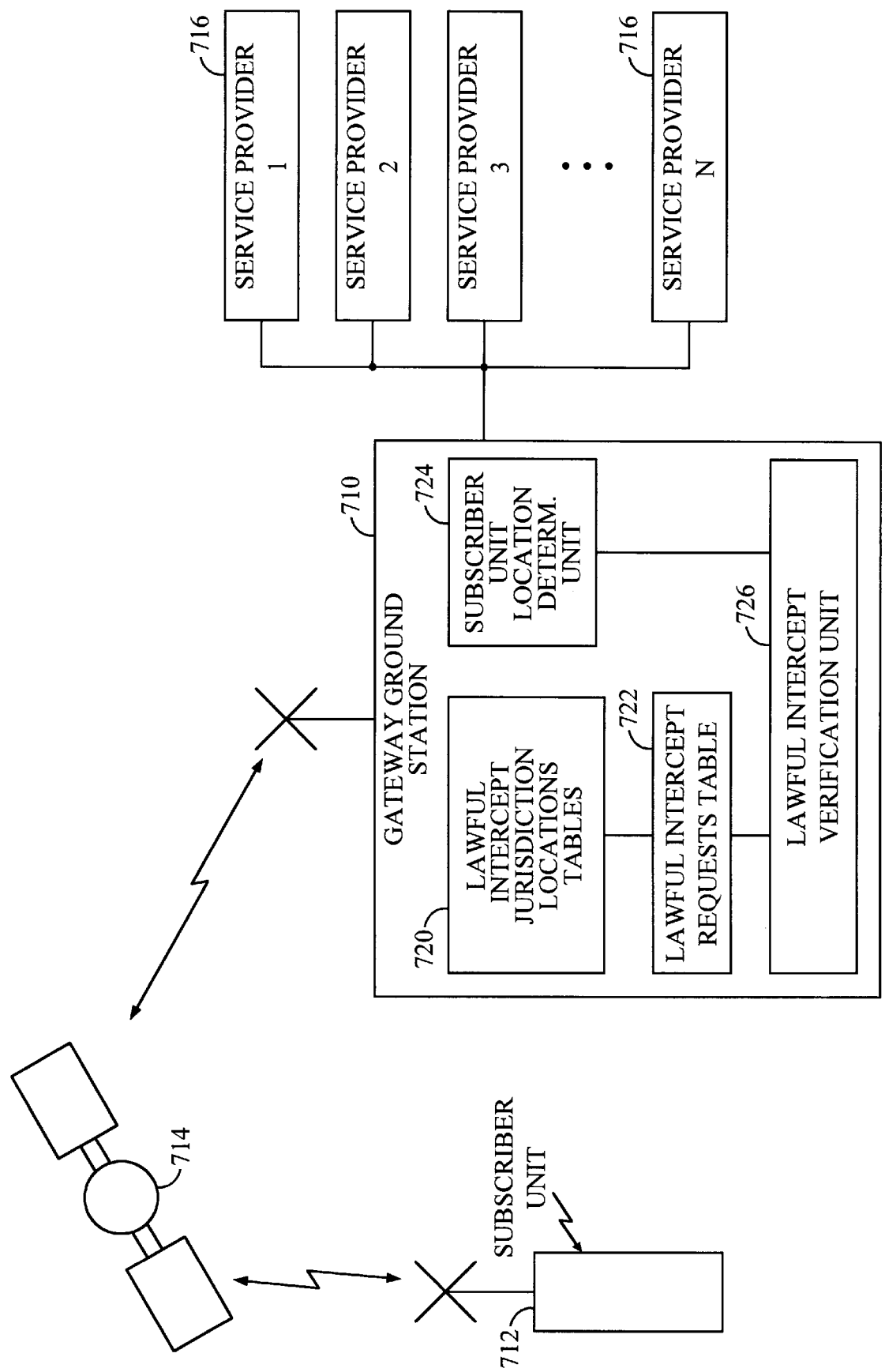
FIG. 11 is a diagram representing a satellite-based mobile telephone system performing the method of FIG. 10.

FIGS. 11–13 illustrate pertinent components of a satellite-based system configured to perform the steps of FIG. 10. The system is similar to that of FIG. 7, with like components identified by like reference numerals beginning with reference numeral 710, and only pertinent differences will be described in detail. FIG. 11 illustrates a ground station 710, an exemplary subscriber unit 712 and an exemplary satellite 714. The subscriber unit includes a subscriber unit location determination unit 724 which receives signals identifying the location of the subscriber unit and a lawful intercept verification unit 726 which determines whether telephone calls to or from the subscriber unit are subject to lawful intercept and, if so, whether such action is jurisdictionally permissible based upon the location of the subscriber unit, using the method of FIG. 10. To this end, verification unit 726 accesses a lawful intercept requests table 722 and a lawful interception jurisdiction locations table 720. Requests table 722, shown in greater detail in FIG. 12, includes, for each subscriber unit subject to some sort of lawful intercept, the identity of the law enforcement agency requesting the intercept and the type of interception to be performed. Examples of intercepts include recording the telephone call, if it is a voice call, or downloading transmitted data, if it is a data communication. Jurisdiction table 720, shown in greater detail in FIG. 13, stores, for each law enforcement agency, the range of locations of subscriber units where the agency has jurisdiction. The range of locations over which jurisdiction is proper may depend upon the type of intercept being performed. Hence, the jurisdiction table may be further subdivided in accordance with the action to be performed. Moreover, the range of jurisdiction may depend upon the specific subscriber unit, i.e. for a given law enforcement agency, the agency may be authorized to intercept calls from one particular user anywhere in the U.S. but may be authorized to intercept calls from another user only when located in one specific state. Hence, information identifying the jurisdictional limitations associated with particular subscriber units may additionally be stored as needed either in jurisdiction table 720 or within intercept requests table 724. Information is stored and updated in the jurisdiction and intercept requests databases upon proper request by the law enforcement agencies and is preferably entered by system operators only subject to court orders or other proper documentation. Such requirements differ, however, from country to country. In some countries no such court orders or other documentation may be required. The range of proper jurisdiction is determined based upon the appropriate documentation, if any, provided by the requesting agency and typically no attempt is made to independently verify such jurisdiction.

In any case, verification unit 726 (FIG. 11), determines whether the subscriber unit is subject to a lawful intercept, then compares the location of the subscriber unit with the ranges of locations of permissible jurisdiction in table 724 and thereby determines whether intercept is permissible and, if so, performs such interceptions. The actual interception may be performed in accordance with conventional techniques which will not be further described herein.

Any time limitations in the jurisdiction is also recorded in the database tables and the time and date of the telephone call are compared to the limitations specified in the database to determined, for example, if jurisdiction has lapsed.

The exemplary embodiments have been primarily described with reference to block diagrams illustrating apparatus elements and flow charts primarily illustrating method steps. As to the flowcharts, each block therein represents both a method step and an apparatus element for performing the recited step. Depending upon the implementation, each apparatus element, or portions thereof, may be configured in hardware, software, firmware or combinations thereof. It should be appreciated that not all components necessary for a complete implementation of a practical system are illustrated or described in detail. Rather, only those components necessary for a thorough understanding of the invention have been illustrated and described. Also, a practical system may include a combination of the features shown in the figures including, for example, a combination of the ground station elements of FIGS. 5, 7 and 11. Most examples herein have been described in connection with satellite-based systems. Principles of the invention however may be applied to any mobile telephony system including cellular telephone systems. For cellular systems, the location of the subscriber unit may be tracked or otherwise determined on a cell by cell basis.

Finally, the preceding description of the preferred and exemplary embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A mobile communication system comprising:
    means for processing a mobile telephone communication to or from a subscriber unit;
    means for determining the location of the subscriber unit;
    means for determining whether law enforcement authorities have requested that telephone communications to or from the subscriber unit are to be intercepted;
    means for identifying whether the law enforcement authorities have proper jurisdiction to intercept a telephone communication to or from the subscriber unit based upon the location of the subscriber unit; and
    means, responsive to an identification that law enforcement authorities do have jurisdiction, for intercepting a telephone communication to or from the subscriber.

2. The system of claim 1 wherein the means for determining whether law enforcement authorities have requested that telephone communications from the subscriber unit are to be intercepted and the means for identifying whether the law enforcement authorities have proper jurisdiction to intercept a telephone communication from the subscriber unit based upon the location of the subscriber unit include means for examining a database identifying subscriber units subject to telephone communication interception, identifying the law enforcement agency requesting the interception and identifying the geographical areas wherein the law enforcement agency has jurisdiction to intercept telephone communications.

3. A mobile communication method comprising the steps of:
    processing a mobile telephone communication to or from a subscriber unit;
    determining the location of the subscriber unit;
    determining whether law enforcement authorities have requested that telephone communications to or from the subscriber unit are to be intercepted;
    identifying whether the law enforcement authorities have proper jurisdiction to intercept a telephone communication to or from the subscriber unit based upon the location of the subscriber unit; and
    if so, intercepting a telephone communication to or from the subscriber.

4. The method of claim 3 wherein the step of determining whether law enforcement authorities have requested that telephone communications from the subscriber unit are to be intercepted and the step of identifying whether the law enforcement authorities have proper jurisdiction to intercept a telephone communication from the subscriber unit based upon the location of the subscriber unit includes the steps of examining a database identifying subscriber units subject to telephone communication interception, identifying the law enforcement agency requesting the interception and identifying the geographical areas wherein the law enforcement agency has jurisdiction to intercept telephone communications.

5. A mobile communication system comprising: means for receiving a telephone call connection request signal from a subscriber unit;
    means for determining the location of the subscriber unit; and
    means for processing the telephone call connection request signal based upon the location of the subscriber unit.

6. The system of claim 5 wherein the subscriber unit is selected from a group of devices each having wireless telephony capability including a mobile telephone, a wireless local loop telephone, a personal data assistant, a dedicated Internet access device, an electronic organizer and a laptop computer.

7. The system of claim 5 wherein the mobile communication system processes mobile telephonic communications in accordance with Code Division Multiple Access (CDMA).

8. The system of claim 5 wherein the telephone call connection request signal specifies a telephonic communication selected from a group including voice communications, data communications and combined voice and data communications.

9. The system of claim 5
    wherein certain predetermined telephone call connection request signals are representative of emergency services telephone numbers; and
    wherein the means for processing the telephone call connection request signal operates to interpret the request signal as identifying a nearest appropriate emergency services station to the subscriber unit based upon the location of the subscriber unit.

10. The system of claim 9
    wherein the emergency services stations are selected from a group including police stations, fire departments, hospitals, and ambulance services.

11. The system of claim 5 wherein the means for determining the location of the subscriber unit operates to identify a geographical area in which the subscriber unit is located.

12. The system of claim 11 wherein the law enforcement authorities have jurisdiction to intercept telephone calls from subscriber units in certain geographical areas and wherein the system further includes
    means for determining whether law enforcement authorities have requested that telephone communications from the subscriber unit are to be intercepted;
    means for identifying whether the law enforcement authorities have proper jurisdiction to intercept a telephone communication from the subscriber unit based upon the location of the subscriber unit; and
    means, responsive to an identification that law enforcement authorities do have jurisdiction, for intercepting a telephone communication from the subscriber unit as initiated by the telephone call connection request signal.

13. The system of claim 12 wherein the means for determining whether law enforcement authorities have requested that telephone communications from the subscriber unit are to be intercepted and the means for identifying whether the law enforcement authorities have proper jurisdiction to intercept a telephone communication from the subscriber unit based upon the location of the subscriber unit include means for examining a database identifying subscriber units subject to telephone communication interception, identifying the law enforcement agency requesting the interception and identifying the geographical areas wherein the law enforcement agency has jurisdiction to intercept telephone communications.

14. The system of claim 11 wherein different geographical areas have different telephone number parsing schemes and wherein the means for processing the telephone call connection request signal operates to parse the request signal in accordance with the parsing scheme of the geographical area in which the subscriber unit is located.

15. The system of claim 14 wherein telephone call connection request signal is representative of an alpha-numeric character string.

16. The system of claim 15 wherein the different geographical areas are different countries and wherein the parsing schemes distinguish between local telephone numbers and international telephone numbers with the international telephone numbers being prefixed by an international calling code; and wherein the means for processing the telephone call connection request signal operates to interpret the character string as identifying a local telephone number in the country in which the subscriber unit is located if the character string does not include an international calling code prefix.

17. The system of claim 15 wherein the different geographical areas correspond to different area code regions and wherein the parsing schemes distinguish between local telephone numbers and long distance telephone numbers with the long distance telephone numbers being prefixed by a long distance area code; and wherein the means for processing the telephone call connection request signal operates to interpret the character string as identifying a local telephone number in the area code region in which the subscriber unit is located if the character string does not include a long distance area code prefix.

18. A method for processing mobile communications comprising the steps of:

receiving a telephone call connection request signal from a subscriber unit;

determining the location of the subscriber unit; and interpreting the telephone call connection request signal based upon the location of the subscriber unit.

19. The method of claim 18 wherein the subscriber unit is selected from a group of devices each having wireless telephony capability including a mobile telephone, a wireless local loop telephone, a personal data assistant, a dedicated Internet access device, an electronic organizer and a laptop computer.

20. The method of claim 18 wherein the mobile communication method is performed to process mobile telephonic communications in accordance with Code Division Multiple Access (CDMA).

21. The method of claim 18 wherein the telephone call connection request signal specifies a telephonic communication selected from a group including voice communications, data communications and combined voice and data communications.

22. The method of claim 18 wherein certain predetermined telephone call connection request signals are representative of emergency services telephone numbers; and wherein the step of interpreting the telephone call connection request signal is performed to interpret the request signal as identifying a nearest appropriate emergency services station to the subscriber unit based upon the location of the subscriber unit.

23. The method of claim 22 wherein the emergency services stations are selected from a group including police stations, fire departments, hospitals, and ambulance services.

24. The method of claim 18 wherein the step of determining the location of the subscriber unit is performed to identify a geographical area in which the subscriber unit is located.

25. The method of claim 24 wherein the law enforcement authorities have jurisdiction to intercept telephone calls from subscriber units in certain geographical areas and wherein the method further includes the steps of determining whether law enforcement authorities have requested that telephone communications from the subscriber unit are to be intercepted;

identifying whether the law enforcement authorities have proper jurisdiction to intercept a telephone communication from the subscriber unit based upon the location of the subscriber unit; and if so, intercepting a telephone communication from the subscriber unit as initiated by the telephone call connection request signal.

26. The method of claim 25 wherein the step of determining whether law enforcement authorities have requested that telephone communications from the subscriber unit are to be intercepted and the step of identifying whether the law enforcement authorities have proper jurisdiction to intercept a telephone communication from the subscriber unit based upon the location of the subscriber unit includes the steps of examining a database identifying subscriber units subject to telephone communication interception, identifying the law enforcement agency requesting the interception and identifying the geographical areas wherein the law enforcement agency has jurisdiction to intercept telephone communications.

27. The method of claim 24 wherein different geographical areas have different telephone number parsing schemes and wherein the step of interpreting the telephone call connection request signal is performed to parse the request signal in accordance with the parsing scheme of the geographical area in which the subscriber unit is located.

28. The method of claim 27 wherein telephone call connection request signal is representative of an alphanumeric character string.

29. The method of claim 28 wherein the different geographical areas are different countries and wherein the parsing schemes distinguish between local telephone numbers and international telephone numbers with the international telephone numbers being prefixed by an international calling code; and wherein the step of interpreting the telephone call connection request signal is performed to interpret the character string as identifying a local telephone number in the country in which the subscriber unit is located if the character string does not include an international calling code prefix.

30. The method of claim 28 wherein the different geographical areas correspond to different area code regions and wherein the parsing schemes distinguish between local telephone numbers and long distance telephone numbers with the long distance telephone numbers being prefixed by a long distance area code; and wherein the step of interpreting the telephone call connection request signal is performed to interpret the character string as identifying a local telephone number in the area code region in which the subscriber unit is located if the character string does not include a long distance area code prefix.

* * * * *